United States Patent
Rigor et al.

(10) Patent No.: US 10,880,270 B1
(45) Date of Patent: Dec. 29, 2020

(54) NETWORK FIREWALL FOR MITIGATING AGAINST PERSISTENT LOW VOLUME ATTACKS

(71) Applicant: Verizon Digital Media Services Inc., Dulles, VA (US)

(72) Inventors: Paul Rigor, Los Angeles, CA (US); Harkeerat Singh Bedi, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 348 days.

(21) Appl. No.: 15/908,490

(22) Filed: Feb. 28, 2018

(51) Int. Cl.
H04L 29/06 (2006.01)

(52) U.S. Cl.
CPC ...... H04L 63/0245 (2013.01); H04L 63/1425 (2013.01); H04L 63/1458 (2013.01); H04L 63/1466 (2013.01); H04L 63/1483 (2013.01)

(58) Field of Classification Search
None
See application file for complete search history.

(56) References Cited

U.S. PATENT DOCUMENTS

| | | | |
|---|---|---|---|
| 2013/0333032 A1* | 12/2013 | Delatorre | H04L 63/1441 726/23 |
| 2016/0080413 A1* | 3/2016 | Smith | H04L 63/1458 726/23 |
| 2016/0261621 A1* | 9/2016 | Srivastava | H04L 63/1466 |

* cited by examiner

*Primary Examiner* — Andrew J Steinle
(74) *Attorney, Agent, or Firm* — Ansari Katiraei LLP; Arman Katiraei; Sadiq Ansari

(57) ABSTRACT

A network firewall detects and protects against persistent low volume attacks based on a sequence of network data having a pattern that matches by some threshold or percentage a sequence of network data from an earlier iteration of the same persistent low volume attack. The attack patterns are derived from tokenizing one or more elements from a captured sequence of network data that is representative of an attack iteration. Counts for different resulting tokens may be stored in a feature vector that represents the attack pattern. If subsequent sequences of network data have a sufficient number of similar token, a pattern match can be identified and the firewall can take protective action including blacklisting the sending clients, blocking the traffic, redirecting the traffic, sending a problem to verify the sender is an actual user, or other actions.

18 Claims, 8 Drawing Sheets

NETWORK FIREWALL FOR MITIGATING AGAINST PERSISTENT LOW VOLUME ATTACKS

BACKGROUND ART

Network attacks against servers and other devices that are remotely accessible over a digital network, such as the Internet, take many forms depending on the objective of the attacker. Distributed Denial of Service (DDoS) attacks are a common form of network attacks. These are volumetric attacks in which the attacker attempts to overwhelm and take down the site or the devices providing access to the content or services of the site with a high volume of packets, connections, or requests. Other attacks including SQL injection attacks, cross-site scripting attacks, phishing attacks, and credential reuse attacks, as some examples, attempt to inject malicious traffic into the site or the devices providing access to the content or services of the site in order to take control of the site, take down the site, or otherwise infect clients accessing the site.

Firewalls, whether implemented as specialized hardware or software running as virtual machines on one or more network devices, attempt to detect and combat against such attacks. Firewalls may be configured with one or more rule sets. A rule set defines the signatures (e.g., properties, parameters, values, or other qualities of network traffic) for various attacks that the firewall detects and protects against. The OWASP ModSecurity Core Rule Set provides a set of generic attack detection rules for detecting and protecting against network traffic that harbors malicious content.

Firewalls may also combat against volumetric attacks based on a semi-stateful tracking of incoming traffic. In particular, a firewall may assign scores to the network traffic. The scores are based on the number of rules from the one or more configured rule sets that the network traffic violates and the severity of the violated rules. The scores can also account for the amount of network traffic originating from a client. The firewall aggregates scores for different clients or for different sites targeted by the network traffic. A high aggregate score can be indicative of unusual client behavior and signs of a volumetric attack. In particular, a volumetric attack is detected when an abnormal number of network traffic from a subset of clients produce an aggregate score in a particular interval that exceeds a threshold. If the aggregate score exceeds the threshold, the firewall can take action against the suspected attack.

The firewall's tracking of the subset of clients is semi-stateful because the actual contents of the network traffic are not tracked. The firewall tracks the score for the one or more clients, with the score representing, in part, the volume of network traffic sent by the client and whether or not the network data was deemed malicious by the firewall rules.

The semi-stateful tracking of an attack as well as the one-to-one matching against the defined rules of the configured rule sets are weaknesses that are exploited by a new form of attack referred to a persistent low volume attack. Persistent low volume attacks are not detected by traditional firewalls for a variety of reasons. Persistent low volume attack traffic can be structured to avoid violating the firewall rules, sent at a slow rate to mimic valid user traffic rates, sent in small bursts with each burst lasting a few minutes or maybe hours, and/or sent with different addressing. Since each burst or iteration of a persistent low volume attack can have a different signature, the persistent low volume attack traffic is extremely difficult to differentiate from valid user traffic.

The objective of the persistent low volume attack can be to periodically scrape different subsets of information from a site and misappropriate that information for a competitor's advantage. Another objective can be to periodically scan different parts of a site for vulnerabilities that can later be exploited with other types of targeted attacks. For instance, application programming interface (API) fuzzing or technology specific scanning can go undetected or be extremely difficult to detect when performed with a persistent low volume attack.

Accordingly, there is a need for a new firewall that can detect and combat against persistent low volume attacks. It may be difficult to detect the initial iteration of a persistent low volume attack. However, these attacks may be recurring and periodic. Accordingly, there is a need for a firewall that can detect the recurring patterns, burst behavior, and/or changing attack signatures of different persistent low volume attacks, and prevent future iterations of those attacks.

DETAILED DESCRIPTION

Figure 1:
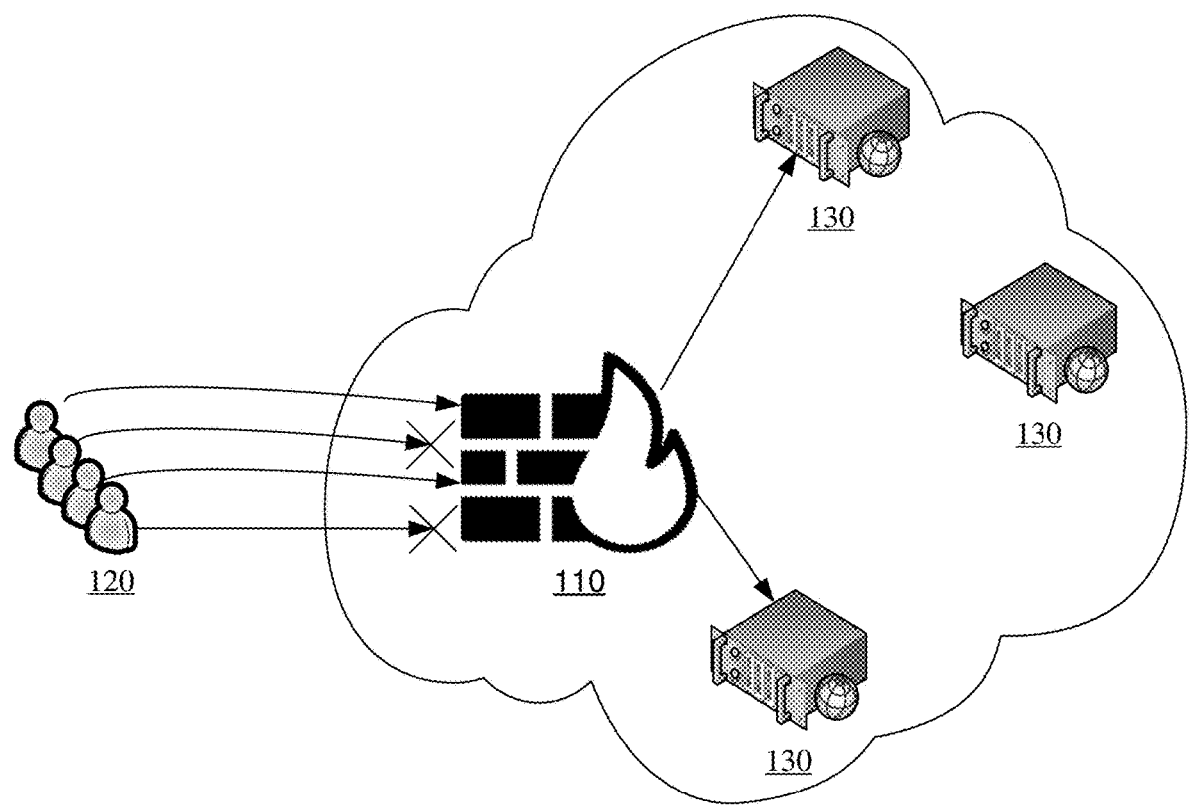
FIG. 1 illustrates an exemplary operating network environment for the PLVA firewall in accordance with some embodiments.

This disclosure is for a persistent low volume attack (PLVA) firewall that detects and protects against persistent low volume attacks in addition to or in lieu of providing protections against volumetric attacks and network traffic containing malicious traffic. The PLVA firewall can be a network firewall appliance or device (i.e., specialized hardware for detecting and protecting against network attacks). The PLVA firewall can also be a software or component executing on other network devices (e.g., load balancing servers, caching servers, distribution servers, etc.).

The PLVA firewall detects and stores patterns from network data associated with at least one iteration of different persistent low volume attacks. The network data can include different networking protocol (e.g., Internet Protocol (IP), Transmission Control Protocol (TCP), User Datagram Protocol (UDP), and/or HyperText Transfer Protocol (HTTP)) packets, requests, or other messages. Within the network data are various header and/or payload (i.e., body) elements including header parameters, addressing, Uniform Resource Locator (URL), query string, user agent, form or data values, events (e.g., JavaScript onclick, onchange, onmouseover, onkeydown, onload, etc.), methods, actions, code, and other information. Other elements associated with the network data can include the fingerprint (e.g., browser, tool, player, or application), geolocation, message header ordering, timing behavior (e.g., burst rate, frequency, and/or time at which a client sends traffic to the PLVA firewall), and other information about the sending client user or client device (e.g., touchscreen enabled, screen resolution, JavaScript enabled, etc.). The device fingerprint may, for example, be determined from telemetry input (e.g., swipe input from touch sensors, gyroscope input, and other hardware input) that is obtained from the device via an available software development kit or API for the device. The PLVA firewall performs transformations on one or more of the above enumerated and/or other elements of the network data, as the network data is received or sometime thereafter, to produce tokens that are representative of the network data. As some examples, the tokens may be different k-length strings or hash results (e.g., locality sensitive hashing) of the various network data elements. The tokens or token counts may be entered into feature vectors. The feature vectors form the patterns from which subsequent iterations of the persistent low volume attacks can be detected even when the persistent low volume attack signature (e.g., one or more of the above enumerated or other elements of the network data) changes from one iteration to the next. The transformations, tokens, and feature vectors produce a canonical representation of the network data such that the detected and stored patterns are independent of and exclude storing of the actual network data from which the patterns are derived.

The network data transformation into the canonical representation of tokens provides an efficient implementation for tracking the attack patterns. The canonical representation allows the PLVA firewall to perform an effectively stateless identification of the repeating patterns without having to store a copy of each packet, request, cookie, form value, or other element from the network data that forms the attack pattern. This significantly reduces memory and processor consumption at the PLVA firewall, thereby allowing the persistent low volume attack detection to occur in real-time and in conjunction with other traditional attack detection methodologies.

The PLVA firewall detects subsequent iterations of a persistent low volume attack based on transformations of subsequent network data sequences producing similar, although not identical, patterns to the stored patterns. The transformations and pattern comparisons can be performed as or contemporaneously with the PLVA receiving the network data. More specifically, the token transformation of the network data and comparison against the canonical representation of the attack pattern allows the PLVA firewall to detect repeating persistent low volume attacks even when various parts of the attack sequence change from iteration to iteration. For instance, the PLVA firewall can detect, from at least one previous attack iteration, subsequent iterations in which the addressing, targets, contents, bursting, and/or other parameters, values, or behavior of the network data change. In so doing, the PLVA can protect against site scrapping, automated information misappropriation, API fuzzing, technology specific scanning, and other vulnerability scanning attacks Upon detecting a subsequent iteration, the PLVA firewall performs protective actions to interrupt or otherwise disrupt completion of that attack iteration. The protective actions can include blocking, dropping, or redirecting (e.g., to a blackhole address, honeypot for future analysis, or back to client for reissue) the attack traffic, or responding to the attack traffic with a computational problem for the requesting client to solve with a correct solution before permitting the client traffic through the PLVA firewall. In doing so, the network firewall safeguards the sites, pages, and other content or services under its protection from the scraping, probing, or other unwanted behavior of the persistent low volume attack.

The PLVA firewall differs from traditional firewalls because the PLVA firewall is able to detect, track, and protect against the repeating patterns of a low volume persistent attack even if the network data of each attack iteration is sent without malicious payloads (that would violate firewall rules from one or more rule sets), at a slow rate (so as to not trigger volumetric attack protections), from different addresses, with different attack signatures, or other changing attack parameters, values, or behavior. In other words, the PLVA firewall combats against persistent low volume attacks that blend in as normal user traffic and are undetectable with traditional firewall protections. As mentioned above.

FIG. 1 illustrates an exemplary operating network environment for the PLVA firewall in accordance with some embodiments. In this figure, the PLVA firewall 110 is shown as a hardware network device or appliance that shields a set of servers 130 from attacks originating from various clients 120 (e.g., clients that request content or services from the set of servers 130). In other words, the PLVA firewall 110 is a separate network device than the network devices (i.e., the set of servers 130) that provide content and services to the clients 120.

The PLVA firewall 110 is disposed at a network point of ingress to the set of servers 130. The PLVA firewall 110 has a network interface with which the PLVA firewall 110 receives network data from the one or more clients 120 over a digital network, such as the Internet, before the network data is processed and responded to by the set of servers 130.

The PLVA firewall 110 shields the set of servers 130 from persistent low volume attacks embedded in the network data by one or more botnets hiding amongst the clients 130 or by some other subset of attacking clients. In some embodiments, the PLVA firewall 110 also shields the set of servers 130 from network data with malicious payloads, volumetric attacks (e.g., Distributed Denial of Service (DDoS) attacks), SQL injection attacks, cross-site scripting attacks, phishing attacks, credential reuse attacks, and other forms of network attacks. In some such embodiments, the PLVA firewall supplements existing firewall functionality with the ability to detect and combat persistent low volume attacks, wherein the existing functionality relies on one or more rule sets and semi-stateful network data scoring.

Although not shown in FIG. 1, the PLVA firewall 110 can, alternatively or additionally, execute as a virtual machine running on one or more other network devices requiring or providing protection against persistent low volume attacks. For instance, the PLVA firewall 110 can operate in conjunction with a load balancing server (e.g., a network device that distributes the network data across the set of servers 130). In some such embodiments, the PLVA firewall 110 is a software component or module that integrates with the load balancing server to provide protections against persistent low volume attacks and to distribute network data that is verified to be safe across the set of servers 130.

In some other embodiments, the PLVA firewall 110 is a software component or module that integrates with each server of the set of servers 130. Each server from the set of servers 130 screens network data directed to that server in order to determine if it is part of a persistent low volume attack. If the received network data is part of a persistent low volume attack, the server takes protective action against the network data. Otherwise, the server processes or responds to the network data.

Execution of the PLVA firewall 110 on each server of the set of servers 130 can also form a distributed PLVA firewall. As part of the distributed PLVA firewall, the set of servers 130 can share network data with one another in order to identify persistent low volume attack patterns that span more than one server. The set of servers 130 can also share patterns of detected persistent low volume attacks with one another so that each individual server 130 does not have to independently detect the attack pattern before taking protective action. Similarly, the set of servers 130 can share blacklist information with one another, wherein the blacklist includes addressing or other identifiers of clients that different servers from the set of servers 130 have identified as engaging in a persistent low volume attack or other form of attacks. The other servers can use the blacklist information to protect themselves from those clients without pattern detection or subsequent attack iteration identification.

The PLVA firewall, operating independently or as a distributed PLVA firewall, can also base its protections based on network data, persistent low volume attack patterns, or blacklists provided by customers or third parties. Customers can be entities whose content or services are hosted and/or distributed by one or more of the set of servers 130. Third-parties can be entities that run an instance of the PLVA firewall on their own devices or systems and that share network data, attack patterns, or blacklists with the PLVA firewall 110 running on the set of servers 130.

Figure 2:
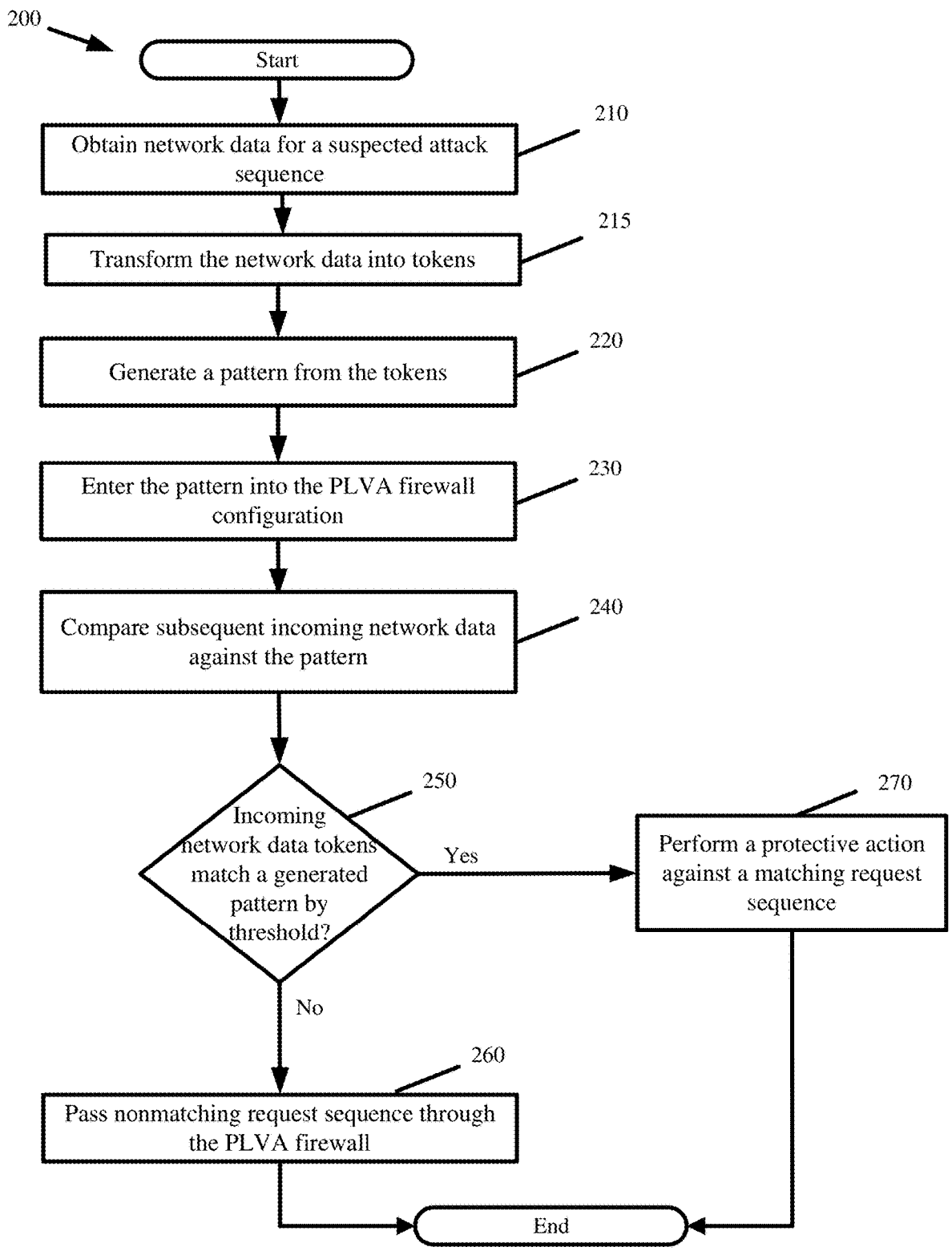
FIG. 2 presents a process by which the PLVA firewall detects and combats persistent low volume attacks in accordance with some embodiments.

FIG. 2 presents a process 200 by which the PLVA firewall detects and combats persistent low volume attacks in accordance with some embodiments. The process 200 commences with the PLVA firewall obtaining (at 210) network data of a suspected attack sequence. The network data for the suspected attack sequence can be obtained from a log of the PLVA firewall or other servers that are communicably coupled with the PLVA firewall. The log records network data that is issued from the one or more clients for some interval or for some number of packets or bytes. The network data for the suspected attack sequence can also be obtained in real-time as the network data arrives at the PLVA firewall.

Obtaining (at 210) the network data for the suspected attack sequence can be conditioned on a specific address or client list. The address or client list may identify blacklisted clients or clients whose activity should be monitored for involvement in a persistent low volume attack or other attack. The address or client list may be provided to the PLVA firewall or derived by the PLVA firewall, for example, via prior history, information sharing, training, machine learning or other automated techniques. For instance, the address or client list may be obtained from other firewall services running on the PLVA firewall (i.e., services detecting volumetric attacks or requests with malicious payloads violating one or more rules from configured rulesets). The address or client list can also be obtained from the servers or sites that are under the protection of the PLVA firewall or by customers or third parties that share information about detected threats, botnets, or attacking clients. The address or client list can also be obtained from other instances of the PLVA firewall operating independently or as part of a distributed PLVA firewall. The PLVA firewall records or logs the network data from the clients identified in the address or client list as opposed to recording or logging the network data from all clients. In some embodiments, the PLVA firewall may log all network data that is received over an interval from all clients before isolating suspected attack sequences from the logs based on the address or client list. If another network device logs the suspected attack sequence, the logs may be periodically provided (via push or pull mechanisms) to the PLVA firewall.

In some embodiments, the PLVA firewall differentiates the network data for the suspected attack sequence from other network data based on PLVA firewall training or machine learning. Training or machine learning can scan prior patterns of attack sequences, network data of known botnets or bad clients, etc., and determine anomalies that are more prevalent in an attack sequence than valid user traffic. Upon detecting one or more such anomalies, the PLVA firewall can then begin obtaining the network data from the one or more clients from which the anomalies originate. Anomalies can include header fields from packets of a particular client that should change according to a particular sequence (e.g., TCP sequence number or TCP acknowledgement number), but instead remain static or change erratically outside of a normal or expected range of values. Examples of other anomalies can include header fields from packets of a particular client that should remain constant but instead change, burst behavior that is constant (e.g., one request every second), changing header ordering, a specific or fixed header ordering, invalid header fields or values, and/or an obsolete browser fingerprint.

The process performs (at 215) one or more transformations on the network data. The transformations produce a canonical representation of the network data in the form of tokens. The tokens can be different k-length segments extracted from one or more elements of the network data, or features identified from hashing one or more elements of the network data. The process then generates (at 220) a pattern from the tokens. The pattern can be a feature vector that tracks the tokens or token counts. Thus, the pattern is a canonical representation derived from various segments or features of the network data forming the suspected attack sequence. The pattern can be used to detect subsequent iterations of the attack sequence even when a subset of the network data segments or features are changed in one or more of the subsequent iterations. The transformation and pattern generation can be performed simultaneously or contemporaneously with obtaining the suspected attack sequence. This reduces how much network data is retained in the PLVA firewall memory.

The sampling window (e.g., amount) of network data from which to generate the pattern can be configured or dynamically set by the PLVA firewall. The sampling window is set to provide the quickest identification of an attack pattern while minimizing the possibility that the pattern is randomly reproduced by the network data of valid clients. In other words, a pattern extracted from a sampling window of two requests may be too small. Segments or features of such a pattern are likely to be reproduced often by valid clients. Conversely, a pattern extracted from a sampling window of two hundred requests may be too large, such that by the time this pattern is recognized during a subsequent attack iteration, the attack iteration may be over. For instance, each attack iteration of a particular persistent low volume attack may include three hundred packets that are sent from one or more clients over some period of time. An extracted pattern should detect a subsequent iteration of that same attack in under one hundred packets, so that the remaining two hundred or so packets in the subsequent iteration can be blocked or otherwise protected against in order to thwart the attack.

The process enters (at 230) the pattern into the PLVA firewall configuration. This trains the PLVA firewall to detect subsequent iterations of the persistent low volume attack represented by that pattern.

The process compares (at 240) subsequent incoming network data against the one or more patterns for persistent low volume attacks entered into the PLVA firewall configuration. In particular, the PLVA firewall transforms the incoming network data into tokens, and compares the tokens from the incoming network data against the tokens for the one or more patterns. The comparison indicates if the incoming network data matches a pattern of a prior attack iteration by one or more thresholds, even if certain values, addressing, burst behavior, or other values and properties change between the different iterations. Further detail for network data transformation and comparison is provided below with reference to FIGS. 3-7. The incoming network data can also be compared against rules from configured rule sets and can be scored for detection of other attacks.

The process then determines (at 250) if tokens from the subsequent incoming network data match any of the patterns entered into the PLVA firewall configuration by a threshold. The incoming sequence of network data may match to a particular pattern by the threshold when the incoming sequence of network data has a number or percentage of segments or features in common with the particular pattern. This can include segments or features from the incoming sequence of network data having values within a range of the values found in the original network data of the particular pattern. In other words, a match can be made even when the incoming sequence of network data does not reproduce the original network data of the particular pattern.

Incoming sequences of network data that do not match to one of the configured patterns are passed (at 260) (e.g., routed, forwarded, redirected, or otherwise transmitted) through the PLVA firewall to their intended destinations. In such cases, the PLVA does not modify, block, or otherwise affect the delivery of the network data to an intended destination under protection of the PLVA firewall. For instance, the PLVA firewall passes a request through to a particular server when the request specifies the particular server as a destination, and the request is determined to not be part of an attack iteration (e.g., a sequence of network data with tokens matching a pattern from a prior iteration of the attack).

The PLVA firewall need not hold network data of a sequence until the entire sequence can be screened. Instead, the PLVA firewall passes through individual packets, requests, or other messages of the network data sequence until a match to one of the configured attack patterns is made. In some embodiments, the network data is passed through or forwarded once the network data is also verified against other rules or conditions with which other types of attacks are detected at the PLVA firewall. For example, the PLVA passes through requests that are verified to not match a configured pattern, not contain a malicious payload, and not be part of a DDoS or other volumetric attack.

In response to an incoming network data sequence matching one of the configured patterns by the threshold, the process performs (at 270) a protective action against the network data or the one or more clients sending the network data. The protective action is configurable and can be different for different sites, content, services, or servers under the protection of the PLVA firewall. The protective action may include one or more of blocking subsequent requests from the identified clients (i.e., blacklisting addressing of the clients), requiring additional action by those clients to verify they are not bots (e.g., solving a hashcache or other problem and returning the correct solution), redirecting the clients, or alerting the site administrator as to the detected iteration of the persistent low volume attack.

The pattern may be generated (at 220) as a feature vector. The feature vector tracks the tokens that are produced from transforming the various elements from the network data obtained for a suspected sequence of a persistent low volume attack, wherein the tokens represent various segments or features from one or more elements of the network data sequence that form the signature for that particular low volume attack iteration. In some embodiments, the feature vector stores a count for token rather than the token itself, such that the feature vector identifies the most common segments or features found in the network data, or more specifically, in one or more elements of the network data, for that attack iteration. In this manner, the feature vector provides a canonical representation for the pattern of the suspected attack sequence.

As noted above, the pattern may be generated by performing various transformations on the network data, and more specifically, on one or more elements of or associated with the network data. In some embodiments, the PLVA firewall performs a k-mer transformation on a set of elements associated with the network data from the suspected attack sequence. The k-mer transformation may involve tokenizing each URL into all possible substrings of length k, and counting each k-length substring appearing in the URLs of the attack sequence network data. The k-length substring becomes the token that is tracked with the feature vector. In some such embodiments, the feature vector is a bit array with each array element or index storing the count for a different k-mer length token. A hashing function can be used to map the tokens to the feature vector array.

Figure 3:
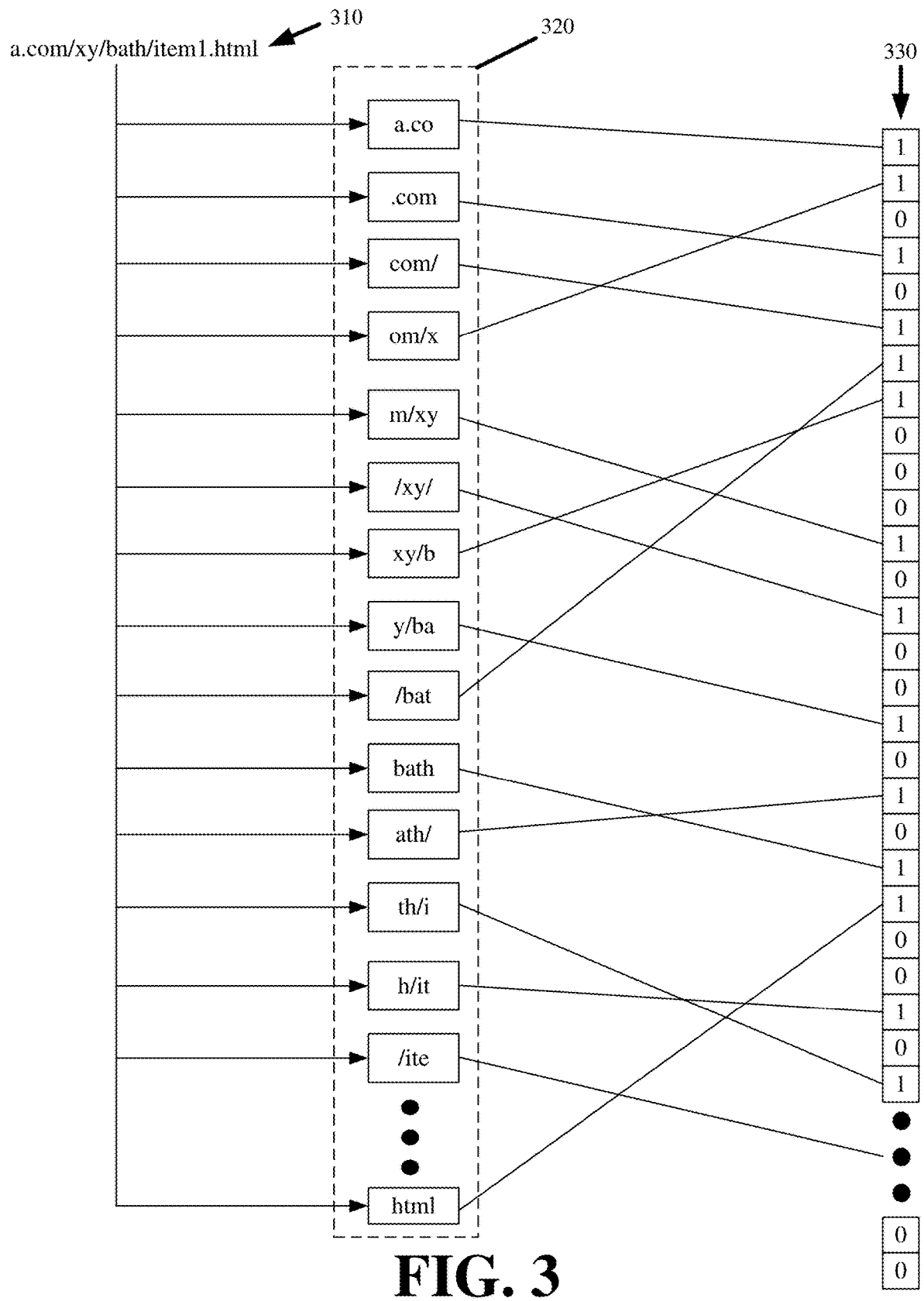
FIG. 3 conceptually illustrates the k-mer tokenization of a request URL from a persistent low volume attack in accordance with some embodiments.

FIG. 3 conceptually illustrates the k-mer tokenization of a request URL 310 from a persistent low volume attack in accordance with some embodiments. As shown, the request URL 310 is transformed into different k-mer tokens of 4 alphanumeric characters or symbols. Column 320 illustrates the different k-mer tokens resulting from transforming the request URL 310. A count for each token of length k encountered in the request URL 310 is added to a feature vector 330. The feature vector 330 tracks the aggregate counts for all tokens from all URLs in the network data of the recorded persistent low volume attack.

One or more such feature vectors can be generated to tokenize the URLs in the network data of the suspected attack sequence with different k-length tokens. For example, a first feature vector can be generated to track tokens with a length of 4 characters and a second feature vector can be generated to track tokens with a length of 6 characters. The first and second feature vectors provide different canonical representations of the same pattern. The different canonical representations increase the accuracy with which the presence of a particular persistent low volume attack pattern is found in subsequent sequences of network data. Different feature vectors can also be created to track the patterns of different suspected attack sequences or different persistent low volume attacks.

The feature vectors provide a condensed and efficient representation of each pattern. Pattern matches can be found using the feature vectors without exact token matching. In other words, subsequent iterations of a persistent low volume attack in which the transformation produces some different tokens (e.g., because of changes to the sender address, URL request path, packet headers, or other packet/request parameters) can still be detected with a feature vector provided that other tokens (e.g., transformations of the user agent, browser fingerprint, header ordering, burst behavior, etc.) remain the same or are similar. This can include detecting an attack sequence with network data having elements that should not change but that do change (e.g., incremented or randomly set), or having elements that should change but that are static (e.g., sequence number).

Figure 4:
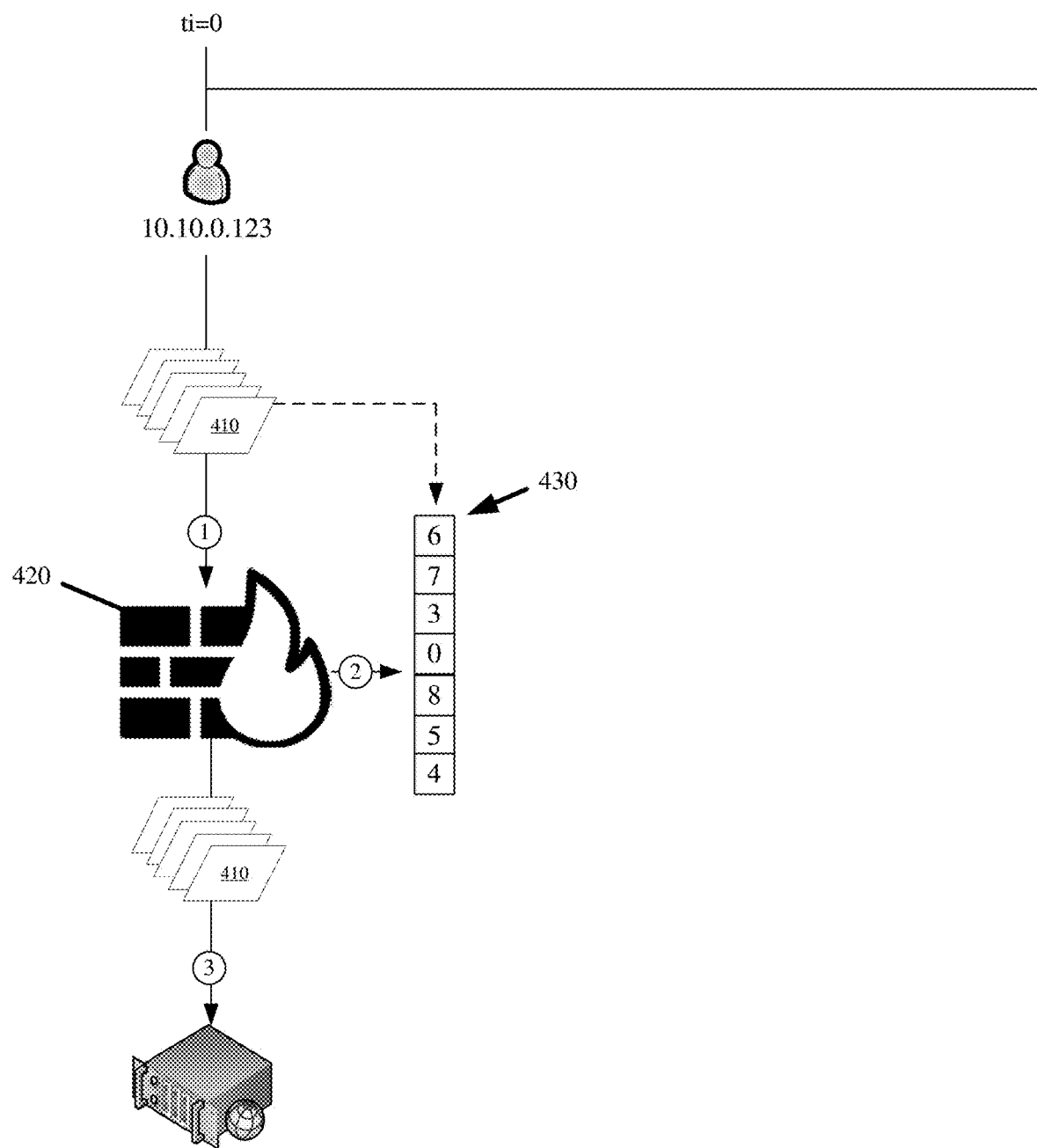
FIGS. 4-6 illustrate the PLVA firewall of some embodiments detecting a subsequent iteration of a persistent low volume attack with a sequence of network data that is different than, but has a similar pattern, as a sequence of network data representing an earlier iteration of the attack.

FIG. 4 illustrates the PLVA firewall of some embodiments producing a feature vector that represents a persistent low volume attack pattern from a first set of network data that is representative of one iteration of that persistent low volume attack pattern. The first set of network data 410 arrives at the PLVA firewall 420 over a first interval (ti=0). The first set of network data 410 is determined to represent part of one iteration of a persistent low volume attack. For instance, the first set of network data 410 may be the first twenty requests of a persistent low volume attack iteration that spans one hundred total requests. The determination that the first set of network data 410 represents part of the attack iteration may be conditioned on the addressing of the one or more clients sending the first set of network data 410 being blacklisted. Alternatively, the determination may be conditioned on the one or more clients being suspected of attacking behavior for other reasons including sending requests that violate other firewall configured rules or sending network data with anomalies determined from machine learning performed on network data of other attack sequences.

As per the methodologies above, the PLVA firewall 420 transforms the network data of the first set of network data 410 into a set of tokens. The transformation can be performed on one or more of the network data elements (e.g., URL, header parameters, values, events, actions, or other information within the network data) of the first set of network data 410. In this example, the PLVA firewall 420 tracks in the feature vector 430, the number of times specific k-length tokens appear in the first set of network data 410.

In this example, the feature vector 430 identifies that the URLs of the first set of network data 410 specify many of the same directory paths as a result of specific tokens having high counts and other tokens having low counts. This is typical scraping or probing behavior of a persistent low volume attack in which a botnet iterates through a directory path in order to access each page, site, or piece of information before iterating through a next directory path. The feature vector can also track the botnet jumping from one page, site, or piece of information directly to another without clicking or invoking any links. The feature vector tracks such behavior when there is no or a very low count for k-mer tokens for "onclick" or "href" link activations, although there will be a high count for k-mer tokens to specific directory paths for different sites that have been accessed by that botnet.

Figure 5:
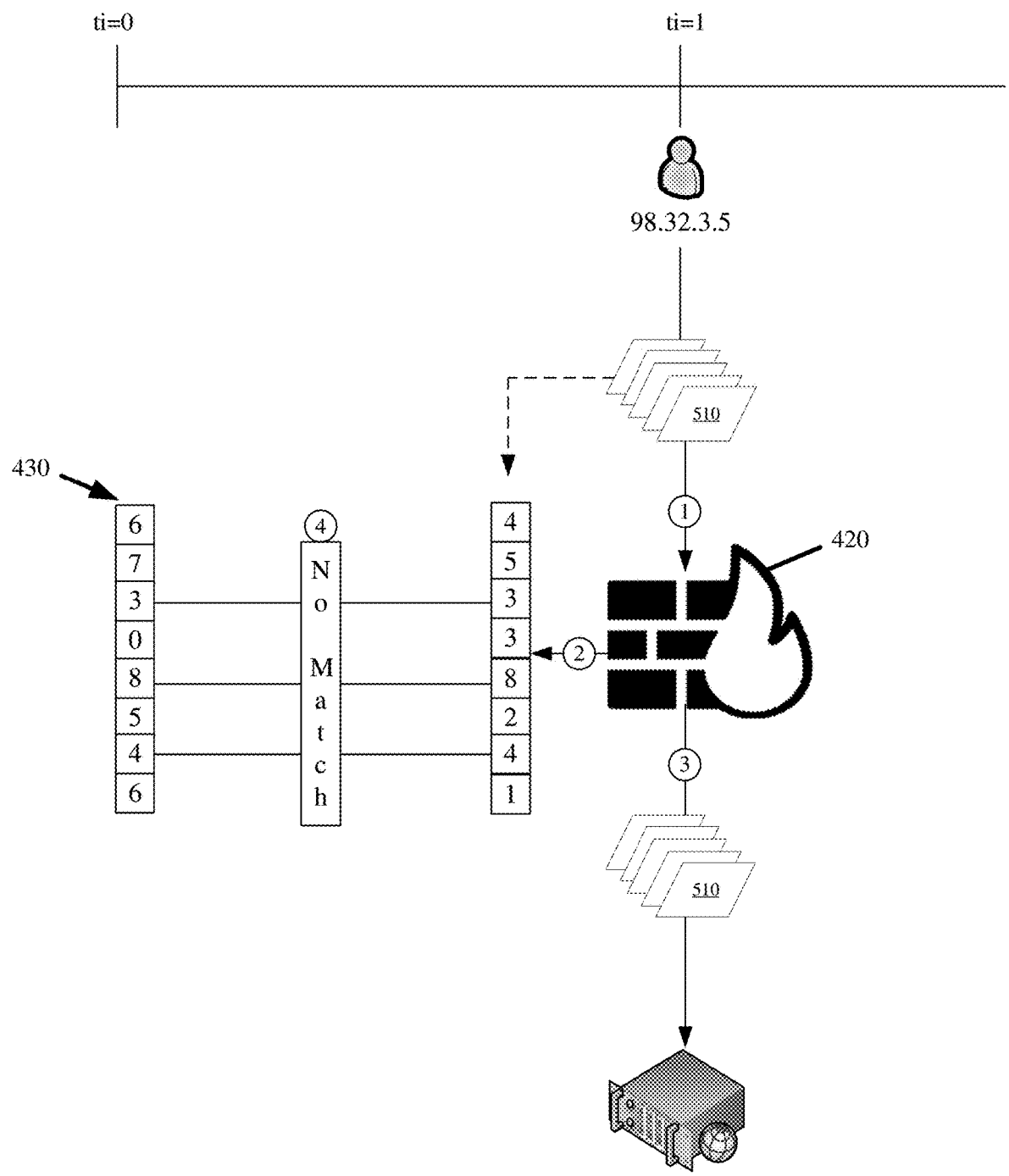

FIG. 5 illustrates the PLVA firewall 420 of FIG. 4 receiving a second set of network data 510 over a later second interval (ti=1) from one or more different clients. The PLVA firewall 420 tokenizes the network data of the second set of network data 510 and then compares the tokens against the feature vector 430. A threshold match to the pattern of the persistent low volume attack represented by the feature vector 430 is made when the resulting tokens from the second set of network data 510 match at least 75% of the tokens in the feature vector 430.

In this case, less than half of the tokens match (e.g., three out of eight match). Consequently, the second set of network data 510 has a different pattern than that of the persistent low volume attack represented through the feature vector 430. The PLVA firewall 420 forwards the second set of network data 510 and subsequent network data from the clients sending the second set of network data 510 to the intended destination.

Figure 6:
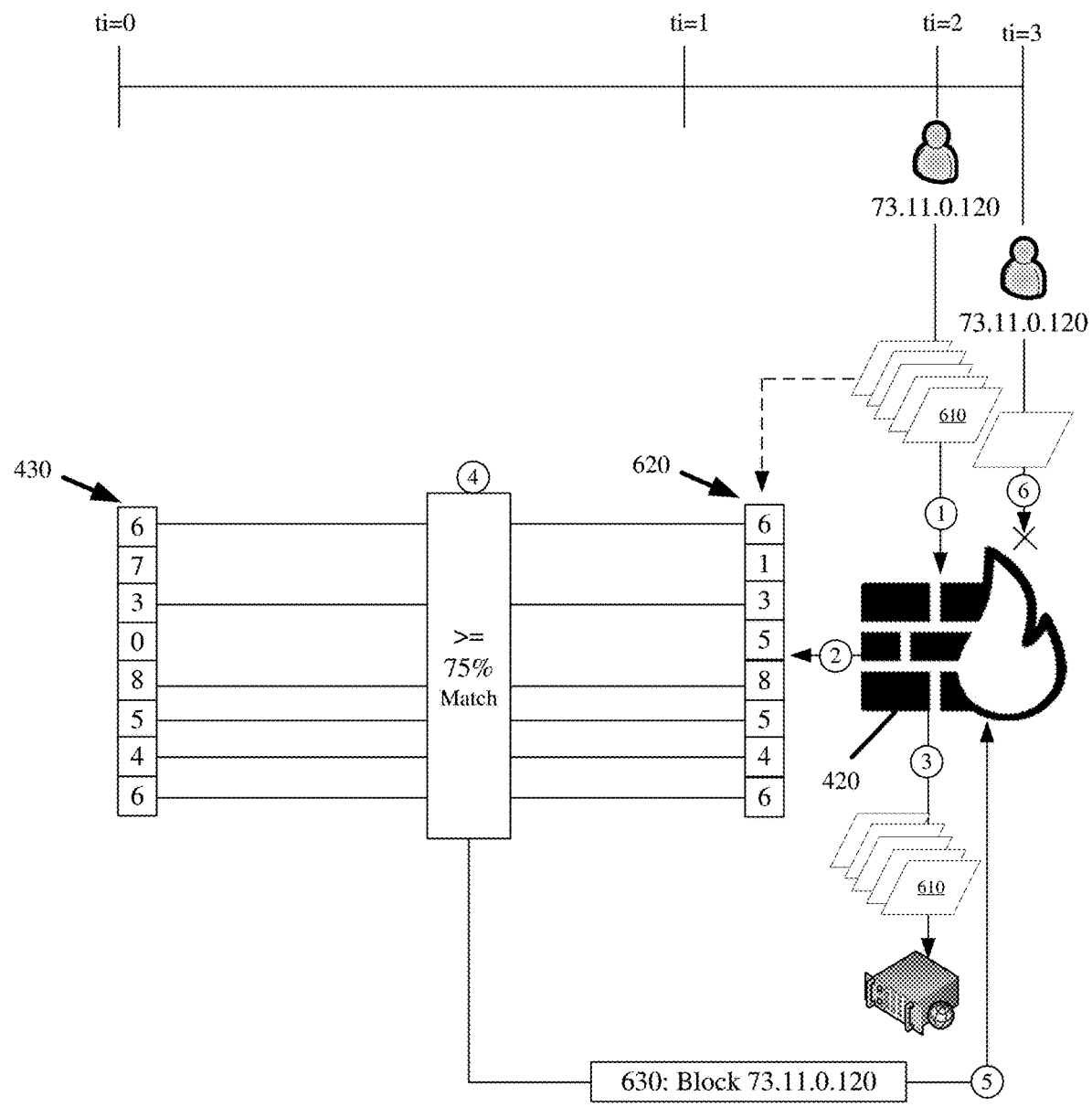

FIG. 6 illustrates the PLVA firewall 420 of FIG. 4 receiving a third set of network data 610 over a later third interval (ti=2) from one or more different clients. The third set of network data 610 is a subsequent iteration of the persistent low volume attack identified in FIG. 4. The botnet attempts to hide the attack by spoofing the addressing of the clients sending the third set of network data 610 and by changing various elements (e.g., cookie values, query string parameters, header fields, etc.) of the third set of network data 610 such that they are not identical to the first set of network data 410 from which the pattern of the attack is derived.

The PLVA firewall 420 once again transforms the network data of the third set of network data 610 into its k-mer canonical representation. The resulting representation can be stored to a different feature vector 620 than the feature vector 430 storing the pattern for the persistent low volume attack.

The PLVA firewall 420 compares the counts of the k-mer length tokens found in the third set of network data 610 with the counts stored to the feature vector 430 storing the pattern for the persistent low volume attack. The PLVA firewall 420 detects that the third set of network data 610 has 75% of the same k-mer length tokens as the first set of network data 410 from which the pattern of the persistent low volume attack is produced. As noted above, 75% is the threshold or percentage by which the PLVA firewall 420 detects that the third set of network data 610 is a match for the pattern of the persistent low volume attack represented by the feature vector 430.

The pattern match causes the PLVA firewall 420 to treat the third set of network data 610 as a subsequent iteration of the same persistent low volume attack made with first set of network data 410. The PLVA firewall 420 performs one or more protective actions against the one or more clients from which the third set of network data 610 originate. As with the first set of network data 410, the third set of network data 610 represents part of the network data that is issued during an iteration of the attack. Assume that the entirety of each attack iteration spans at least one hundred requests and the third set of network data 610 represents the first twenty of the one hundred requests. Accordingly, the early detection of the attack iteration (i.e., within a fractional subset of the overall set of requests for the iteration) allows the PLVA firewall 420 to take protective action and stop the remaining eighty requests, packets, or other messages from scraping, probing, or otherwise attacking the sites under the PLVA firewall's protection. In this figure, the PLVA firewall 420 blocks (at 630) the remaining network data of the attack iteration from the one or more clients sending the third set of network data 610. In some embodiments, blocking the remaining network data involves blacklisting the addressing of the clients sending the third set of network data 610 and dropping or otherwise not responding to packets, request, or other messaging coming from the blacklisted clients. Blacklisting the addresses also prevents the botnet from starting another iteration using the same addressing. The blacklist may also be shared with other instances of the PLVA firewall (e.g., forming a distributed PLVA firewall) or network devices providing network protections.

FIG. 6 illustrates that matching of the network data sequence segments to the pattern is based on a threshold number of tokens from the network data sequence having a same count as the pattern stored to the feature vector. In some embodiments, a match is made when the counts of different tokens are within a threshold amount or percentage of one another.

Figure 7:
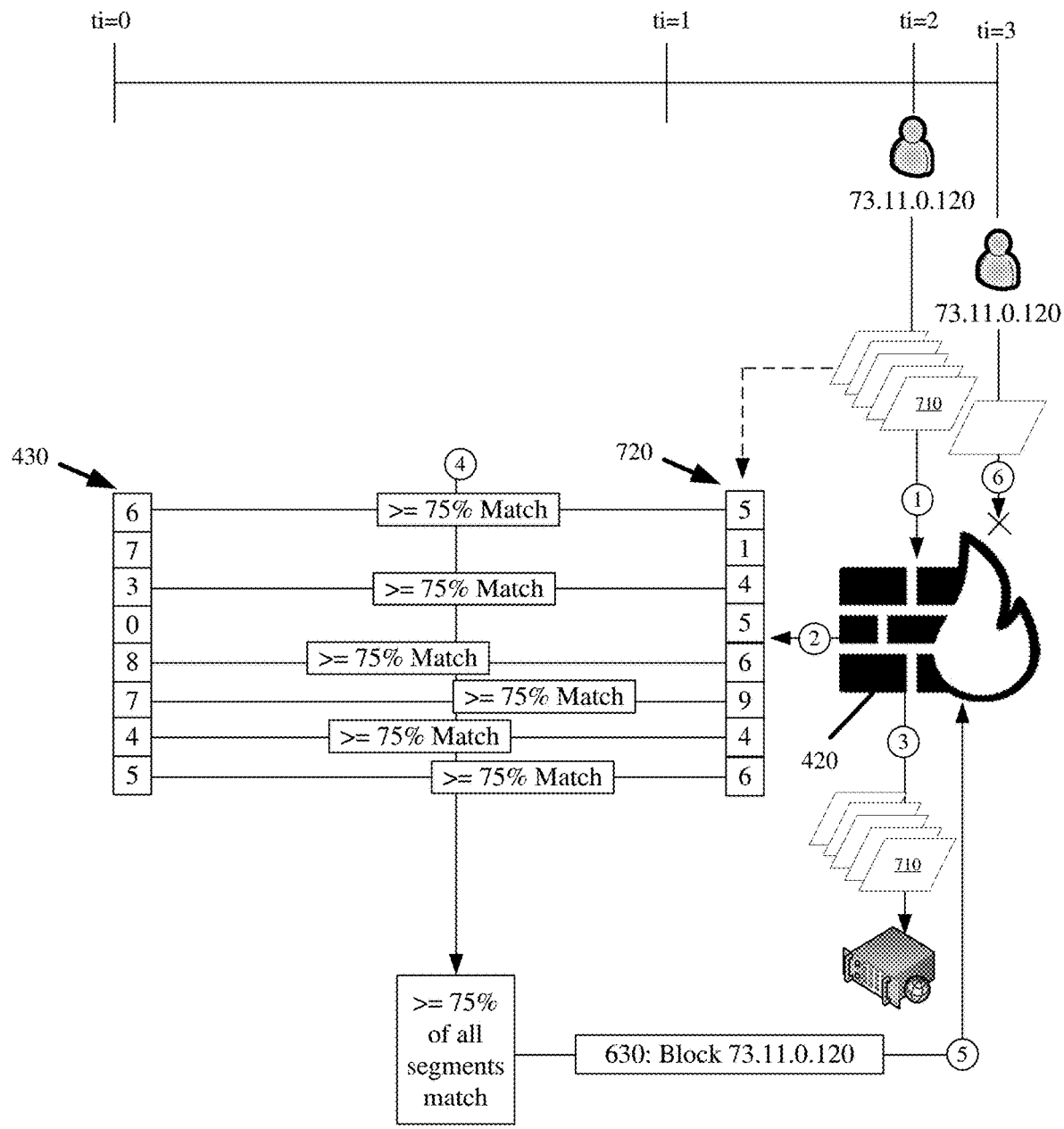
FIG. 7 illustrates the PLVA firewall identifying a network data sequence as a subsequent iteration of a persistent low volume attack based on tokens from the network data sequence being within a first threshold number or percentage of corresponding tokens of the feature vector, and with token counts that are within a second threshold number or percentage of one another.

FIG. 7 illustrates the PLVA firewall 420 identifying a network data sequence 710 as a subsequent iteration of a persistent low volume attack based on a first threshold number or percentage of tokens having counts that are within a second threshold number or percentage of counts for corresponding tokens in a feature vector 430. In this figure, the first threshold and second threshold are set at 75%. The first token in the network data sequence 710 matches to the first token in the feature vector 430, because the first token in the network data sequence is shown to have a count of five (indicating that five instances of the token were identified in the network data sequence 710), the feature vector 430 stores a count of six for this token (indicating that six instances of the same token were found in the attack pattern), and the counts for the same token identified from the network data sequence 710 and the feature vector 430 match by more than 75% (i.e., 5 is 83.3% of 6). Five other tokens from the network data sequence 710 have counts that match to counts of corresponding tokens from the feature vector 430 by or more than the second threshold percentage. The six of eight matching tokens is sufficient to satisfy the first threshold for total matching tokens (e.g., 75% or more of the tokens from the network data sequence 710 have counts matching counts of corresponding tokens of the feature vector 410 by at least 75% or the second threshold). Consequently, the network data sequence 710 is determined to be a repeat iteration of the attack represented by the feature vector 430 pattern.

It should also be noted that the PLVA firewall protections are enacted even if the persistent low volume attack network data sequence does not trigger a single rule for malicious or suspicious payloads from the PLVA firewall rule set, and the network data sequence is passed at a slow rate that it is not considered to be part of a volumetric attack or other form of attack. In other words, the PLVA firewall protections can execute entirely independent or simultaneous with traditional firewall protections for detecting individual packets with malicious or suspicious payloads and detecting volumetric attacks.

The feature vectors, network data element transformations, and canonical representation of the attack sequence are the preferred methodology with which to generate the pattern of a persistent low volume attack. However, it should be noted that other methodologies using different data storage structures, different transformations, and different canonical representations can alternatively be used to isolate and identify an attack pattern from a sequence of requests.

For instance, some embodiments may use locality sensitive hashing, in conjunction with or in lieu of the k-mer transformations, to transform various network data elements into the tokens from which the attack pattern or feature vector is generated. Locality sensitive hashing transforms network data elements with similar or related values (e.g., values within a range) or properties into common tokens. In particular, locality sensitive hashing maps a first set of buckets representing all possible values for a particular network element into a smaller second set of buckets. Such hashing provides an efficient means to track network data elements that are within a range of one another as well as the presence of absence of specific network data elements or element combinations (e.g., a high volume of "href" events regardless of where the events point to, specific browser fingerprints for browser type, version number, and browser capabilities, or specific user agents supporting specific functionality, screen resolutions, etc.).

In some embodiments, the PLVA firewall protections supplement or enhance the traditional firewall protections. A persistent low volume attack may be launched against a site in order to identify the vulnerabilities of that site. Once one or more vulnerabilities are detected, different attacks can be launched to exploit those one or more vulnerabilities. The PLVA firewall protections can prevent, or at least make significantly more difficult, the discovery of those vulnerabilities. Consequently, the attacks exploiting the undiscovered or hard to find vulnerabilities may never occur as a result of the PLVA protections.

Even if a vulnerability is detected by a botnet performing a persistent low volume attack, if the PLVA firewall detects the attack pattern and the addressing of the botnet behind the persistent low volume attack, the PLVA firewall can preemptively blacklist or block those addresses. This then prevents the botnet from sending malicious content to exploit the discovered vulnerabilities. These preemptive blacklisting is especially beneficial when the botnet attempts to exploit a vulnerability with an attack or malicious content that cannot be detected by the rules of the configured rulesets on the PLVA firewall. If the botnet is detected and blacklisted prior to launching the attack, the PLVA firewall will render that attack harmless even though the firewall lacks rules for that attack.

The inverse operation can also be used to improve the PLVA firewall's ability to detect the initial iteration of a persistent low volume attack sequence. In some such embodiments, the traditional firewall functionality of the PLVA firewall can be used to detect addressing of clients engaged in a volumetric attack (i.e., DDoS attack), the sending of malicious or suspicious payloads that violate one or more rules of the configured rulesets, or other attacks. The PLVA firewall can then record the network data sequences of these known or suspected bad actors. The PLVA firewall generates the request patterns of the known or suspected bad actors from the recorded network data sequences. If those bad actors then engage in a persistent low volume attack or the same pattern is observed in clients with different addressing, the PLVA firewall can use the generated patterns to detect and take protective action against those attacks.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
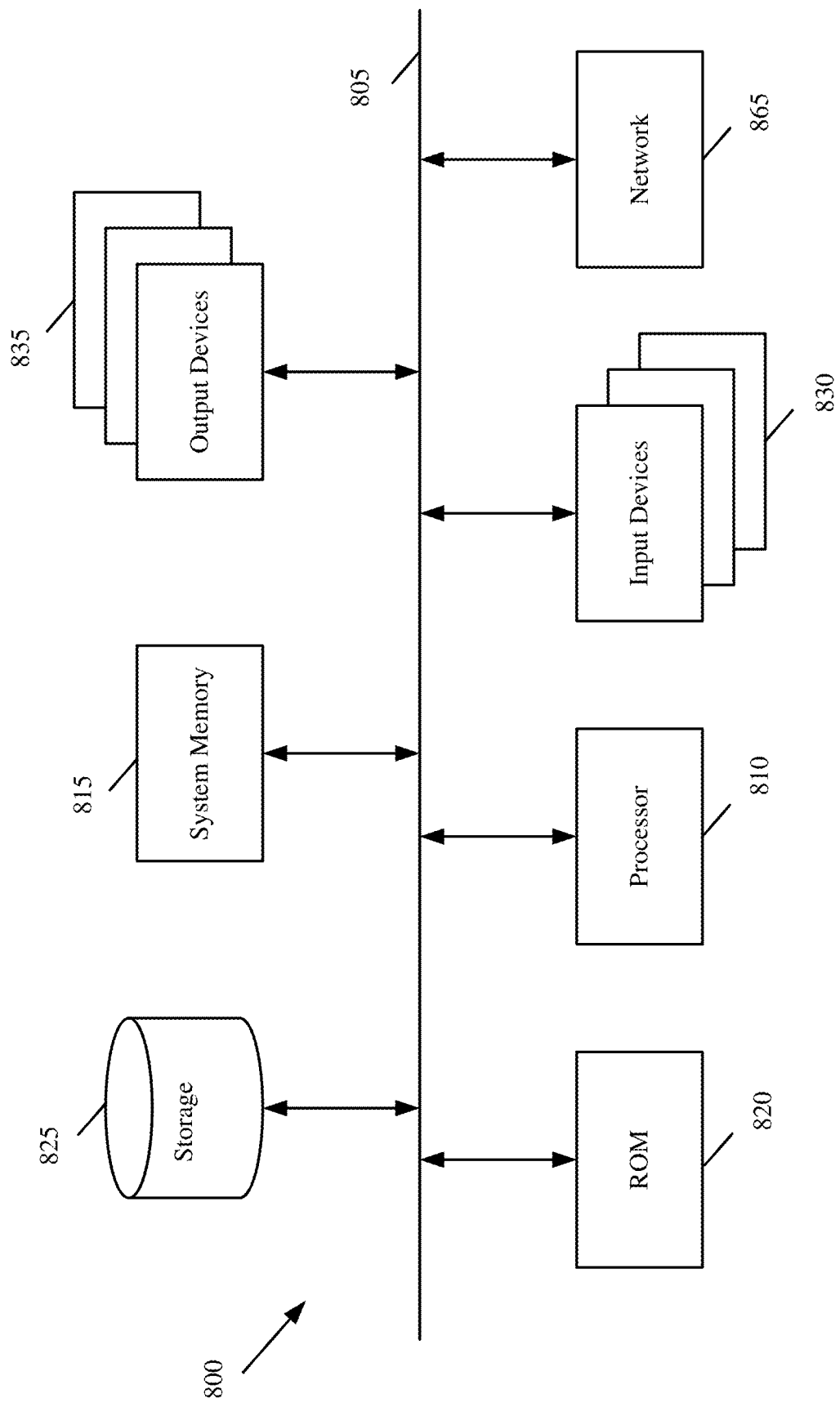
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines described above (e.g., load balancing appliance, back-end server, etc.). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices. The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for protecting against network attacks with a network firewall appliance, the method comprising:

recording a first sequence of network data from one or more first clients, wherein the first sequence of network data comprises a first set of elements;

generating a request pattern based on a first canonical representation of the first set of elements, wherein the first canonical representation is different than the first set of elements;

receiving a second sequence of network data from one or more second clients, wherein the second sequence of network data comprises a different second set of elements;

producing a second canonical representation from the second set of elements, wherein the second canonical representation is different than the second set of elements;

comparing the second canonical representation to the first canonical representation of the request pattern;

receiving at the network firewall appliance, particular network data from the one or more second clients after said comparing; and performing an attack protection on the particular network data in response to the second canonical representation matching the first canonical representation by a threshold.

2. The method of claim 1, wherein generating the request pattern comprises transforming the first set of elements into a first set of tokens.

3. The method of claim 2, wherein the first set of tokens comprise different k-length segments appearing in the first set of elements, wherein each k-length segment is smaller than each element of the first set of elements.

4. The method of claim 2, wherein generating the request pattern further comprises tracking different counts of each token in the first set of tokens to a feature vector.

5. The method of claim 4, wherein producing the second canonical representation comprises transforming the second set of elements into a second set of tokens, and wherein comparing comprises detecting if counts of the second set of tokens are within threshold counts of the first set of tokens.

6. The method of claim 1 further comprising passing the particular network data through the network firewall appliance without performing the attack protection in response to the second canonical representation not matching to the first canonical representation by the threshold.

7. The method of claim 1, wherein performing the attack protection comprises at least one of blocking the particular network data at the network firewall appliance, redirecting the particular network data, or sending a problem for a client sending the particular network data to solve.

8. The method of claim 1, wherein addressing of the one or more first clients is different than addressing of the one or more second clients.

9. The method of claim 1 further comprising verifying against firewall rule sets, that the first and second sequences of network data do not contain attack signatures of known attacks.

10. The method of claim 9 further comprising receiving the first and second sequences of network data at rates less than a rate for a distributed denial of attack.

11. A method comprising:

receiving a first sequence of network data from at least a first client device at a firewall device;

producing a canonical representation from transforming elements of the first sequence of network data;

generating a pattern based on the canonical representation of the elements of the first sequence of network data, wherein the elements include one or more header parameters, payload data, and device signature information;

receiving a second sequence of network data from at least a second client device at the firewall device;

detecting that the second sequence of network data repeats said pattern based on a canonical representation of elements of the second sequence of network data matching the canonical representation of the elements of the first sequence by a threshold; and blocking at the firewall device, subsequent network data the second client device sends after said second sequence of network data in response to detecting a repeat of the pattern from at least the first client device by the second client device.

12. The method of claim 11 further comprising obtaining an address of the first client device as a blacklisted address, and recording the first sequence of network data from the first client device in response to said obtaining and said receiving of the first sequence of network data.

13. The method of claim 11 further comprising blacklisting an address of the second client device in response to said detecting, wherein blacklisting comprises blocking subsequent network data from the second client device at the firewall device.

14. The method of claim 11, wherein said generating comprises counting a number of times different k-length tokens are found in one or more of the elements of the first sequence of network data, and wherein said detecting comprises identifying counts of k-length tokens found in one or more of the elements of the second sequence of network data that match counts of the same k-length tokens from the first sequence of network data by the threshold.

15. A network firewall device comprising:

a network interface receiving a plurality of network data from a plurality of clients;

a memory storing a plurality of attack signatures, request counts from different clients of the plurality of clients, a plurality of patterns, and at least one vector tracking counts of different k-length tokens found in a first set of the plurality of network data from which a pattern of the plurality of patterns is derived; and a processor activating attack protections in response to each one of:

(i) network data from the plurality of network data comprising a signature matching to one of the plurality of attack signatures, (ii) at least one client from the plurality of clients having a request count from said request counts that exceeds a volumetric attack threshold, or (iii) a subset of network data from the plurality of network data matching at least one of the plurality of patterns by a specified threshold.

16. The network firewall device of claim 15, wherein said memory further comprises at least one feature vector representing a pattern from the plurality of patterns.

17. The network firewall device of claim 15, wherein in response to said processor activating the attack protections, the network interface blocks forwarding of (i) network data comprising a signature matching to one of the plurality of attack signatures, (ii) network data from a client with a request count exceeding the volumetric attack threshold, or (iii) network data matching a pattern from the plurality of patterns by the specified percentage.

18. A method comprising:

receiving a first sequence of network data from at least a first client device at a firewall device;

generating a pattern from elements of the first sequence of network data, wherein said generating comprises counting a number of times different k-length tokens are found in one or more of the elements of the first sequence of network data, and wherein the elements include one or more header parameters, payload data, and device signature information;

receiving a second sequence of network data from at least a second client device at the firewall device;

detecting that the second sequence of network data repeats said pattern based on elements of the second sequence of network data matching the elements of the first sequence by a threshold, wherein said detecting comprises identifying counts of k-length tokens found in one or more of the elements of the second sequence of network data that match counts of the same k-length tokens from the first sequence of network data by the threshold; and blocking at the firewall device, subsequent network data the second client device sends after said second sequence of network data in response to detecting a repeat of the pattern from at least the first client device by the second client device.

* * * * *